Sept. 4, 1951  F. W. MARSH  2,566,576
VALVE CONSTRUCTION
Filed April 1, 1947
Fig.1.
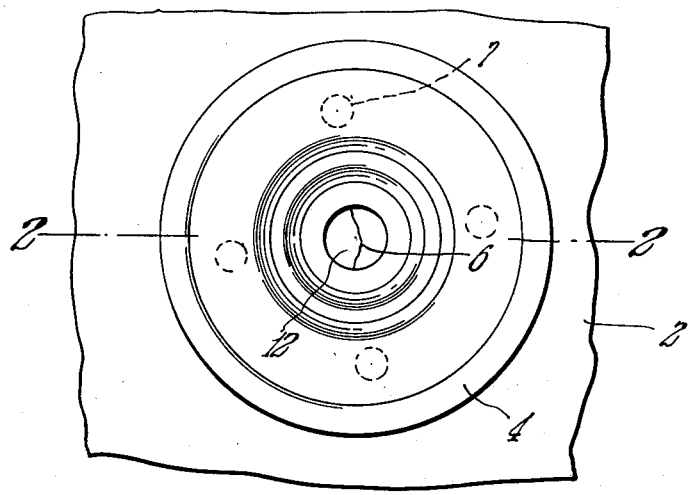
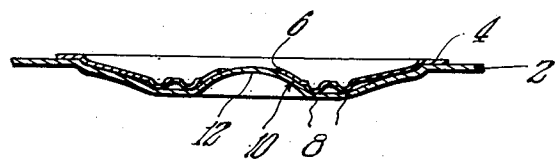
Fig.2.
Inventor
Frederick W. Marsh.
By Walter C. Ross.
Attorney Patented Sept. 4, 1951

2,566,576

UNITED STATES PATENT OFFICE 2,566,576

VALVE CONSTRUCTION

Frederick W. Marsh, Springfield, Mass., assignor to Kestral Corporation, Springfield, Mass., a corporation of Massachusetts Application April 1, 1947, Serial No. 738,621

3 Claims. (Cl. 251—119)

This invention relates to improvements in valve means and is directed more particularly to a valve construction which is adapted for use with objects that are inflated by air or the like and this application is a continuation in part of an application Ser. No. 644,500 filed by me on January 31, 1946.

The principal objects of the invention are the provision of a valve construction for inflatable objects and more particularly for a pliable or more or less elastic wall of an object. Such objects as the invention is adapted for are pillows, mattresses, pads and the like but is generally adapted for any object having at least one wall which is pliable or yieldable for the purpose of inflation.

According to the novel features of the invention, a plate member is secured to the pliable wall of an inflatable object and is so constructed and arranged that the said wall cooperates therewith to prevent the discharge of air from the inflatable object while at the same time air may be introduced into the object.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view of the valve construction of the invention shown in association with a wall of an inflatable object; and Fig. 2 is a sectional elevational view on the line 2—2 of Fig. 1.

Referring now to the drawings more in detail, the invention will be fully described.

A wall of an inflatable object is represented by 2 and said object may take the form of a pillow, cushion, mattress, pad or whatever may be desired. The wall 2 will be made from some pliable and more or less resilient or yieldable material such as rubber, rubber composition or various plastics such as Vinylite, Koroseal, or whatever may be best adapted for the particular construction of the object.

A plate member 4 is provided which will be made from relatively rigid or stiff and preferably thin material. The plate member will have relatively more stiffness or rigidity than the wall member 2 and for the purpose various forms of plastic may be used such as nitro-cellulose, cellulose acetate, Vinylite, hard rubber or the like.

The member 4 will be preferably disc-like in form and will be generally concave and provided with a central opening 6 therethrough. The marginal edge portion of the member 4 will be secured to the wall member 2 in any suitable manner, such as by heat, welding, fusing, cementing, or the like and the method of securement will depend on the material of the wall and the member 4. The plate member 4 will be provided with one or more downwardly or inwardly extending continuous annular corrugations the crowns of which form seats 8. Where more than one seat such as 8 is employed, the said seats will be concentrically arranged and spaced as shown.

The portion of the member 4 inwardly of the innermost seat 8 is concaved or it curves upwardly to the opening 6 to provide a more or less spherical seat as shown.

The wall 2 is provided with one or more openings such as 7 therethrough and these are disposed between the outermost seat 8 and the rim portion of the member 4 which is secured to the wall.

The portion of the wall 2 inwardly of the marginal edge portion of the plate 4 since the said wall 2 is made from pliable or flexible material is adapted to function as a diaphragm and cooperates with the plate 4 to provide therewith a valve construction.

With the construction applied to the wall of an inflatable object air may be forced through the opening 6 so as to move the diaphragm portion of wall 2 away therefrom. In such a case, air flows between the member 4 and the diaphragm portion of wall 2 and passes through the openings 7 into the object of which wall 2 is a part.

When the desired or sufficient pressure has been established within the inflatable object, the pressure forces the portion 12 of the wall 2 upwardly so that it bears against the semi-spherical seat 10 and against the seat or seats 8 thereby preventing escape of air through opening 7 and past the seats. By means of the construction the plurality of separate seats for the diaphragm portion of the wall provides an efficient seal against the escape of air and even should one of the seats become contaminated by any foreign substance so as to permit air to flow therepast the remaining seat or seats function efficiently for sealing purposes.

To permit air to be discharged from the inflated object, it is only necessary to press on the portion 12 of the wall 2 lightly so as to separate the diaphragm from the seats whereby air may flow through the openings 7 and out through openings 6.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A valve construction for an inflatable article having a wall member formed of flexible, elastically expansible material comprising in combination a plate member substantially inflexible relative to the wall member and of substantially uniform thickness throughout, said member being welded around its peripheral edge portion only to the outer face of the wall member, the portion of the wall member within said secured peripheral edge portion being free from attachment to the plate member, the portion of said plate member inwardly of the attached edge portion being inclined inwardly and formed at its central portion with an outwardly extending dome portion having an opening at the top thereof, the portion of the wall member opposite the dome portion being expansible thereinto and into the opening at the top of the dome in the presence of an inflating pressure within the article to seal said opening, the portion of the wall member within said peripheral edge portion of the plate being provided with an opening offset from said dome portion, said last-named opening being closed by a face to face engagement of the adjacent portions of the wall and plate members in the presence of an inflating pressure within the article, the portion of the wall member within said secured peripheral edge portion of the plate member being movable inwardly away from the plate member by inwardly directed pressure through said first-named opening to establish an article inflating and deflating communication between said openings.

2. A valve construction for an inflatable article having a wall member formed of flexible, elastically expansible material comprising in combination a plate member substantially inflexible relative to the wall member and of substantially uniform thickness throughout, said member being welded around its peripheral edge portion only to the outer face of the wall member, the portion of the wall member within said secured peripheral edge portion being free from attachment to the plate member, the central portion of said plate member being formed with an outwardly extending dome portion having an opening at the top thereof, the annular portion of the plate between said dome portion and said attached peripheral portion being inclined inwardly to position the top of the dome portion below the plane of the attached rim of the plate, the portion of the wall member opposite the dome portion of the plate being expansible thereinto and into the opening at the top of the dome in the presence of an inflating pressure within the article to seal said opening, the portion of the wall member within said secured peripheral edge portion of the plate being provided with an opening offset from said dome portion, said last-named opening being closed by a face to face engagement of the adjacent portions of the wall and plate members in the presence of an inflating pressure within the article, the portion of the wall member within said secured peripheral edge portion of the plate member being movable inwardly away from the plate member by inwardly directed pressure through said first-named opening to establish an article inflating and deflating communication between said openings.

3. A valve construction for an inflatable article having a wall member formed of flexible, elastically expansible material comprising in combination a plate member substantially inflexible relative to the wall member and of substantially uniform thickness throughout, said member being welded around its peripheral edge portion only to the outer face of the wall member, the portion of the wall member within said secured peripheral edge portion being free from attachment to the plate member, the central portion of said plate member being formed with an outwardly extending dome portion having an opening at the top thereof, the annular portion of the plate between said dome portion and said attached peripheral portion being inclined inwardly to position the top of the dome portion below the plane of the attached rim of the plate, said plate member being formed with at least one annular corrugation around and closely adjacent the base of the dome, the portion of the wall member opposite the dome portion of the plate being expansible thereinto and into the opening at the top of the dome in the presence of an inflating pressure within the article, the crown of the said corrugation and the edge of said opening forming concentric circular lines of maximum sealing engagement between the plate member and the wall member, to seal said opening, the portion of the wall member between said secured peripheral portion and said corrugation being provided with an opening, said last-named opening being closed by a face to face engagement of the adjacent portions of the wall and plate members in the presence of an inflating pressure within the article, the portion of the wall member within said secured peripheral edge portion of the plate member being movable inwardly away from the plate member by inwardly directed pressure through said first-named opening to establish an article inflating and deflating communication between said openings.

FREDERICK W. MARSH.

REFERENCES CITED

The following references are of record in the file of this patent:

UNITED STATES PATENTS

| Number | Name | Date |
|---|---|---|
| 584,478 | MacSpadden | June 15, 1897 |
| 1,702,981 | Reach | Feb. 19, 1929 |
| 1,910,961 | Perry | May 23, 1933 |
| 2,006,319 | Hueber | June 25, 1935 |
| 2,133,575 | Rosenberg | Oct. 18, 1938 |
| 2,162,603 | Bothe | June 13, 1939 |
| 2,208,181 | Eggleston | July 16, 1940 |

FOREIGN PATENTS

| Number | Country | Date |
|---|---|---|
| 430,453 | Germany | of 1926 |
| 465,535 | France | of 1913 |